(12) United States Patent
Yamashita et al.

(10) Patent No.: US 7,788,019 B2
(45) Date of Patent: Aug. 31, 2010

(54) CONTROL DEVICE OF INTERNAL COMBUSTION ENGINE

(75) Inventors: Hiroshi Yamashita, Anjo (JP); Toshiki Annoura, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/364,546

(22) Filed: Feb. 3, 2009

(65) Prior Publication Data

US 2009/0216429 A1 Aug. 27, 2009

(30) Foreign Application Priority Data

Feb. 27, 2008 (JP) ............................. 2008-046935

(51) Int. Cl.
*F02M 51/00* (2006.01)
*F02D 17/04* (2006.01)
(52) U.S. Cl. ..................... 701/107; 123/479; 73/114.45
(58) Field of Classification Search ................. 701/107; 123/479, 299; 73/114.38, 114.45
See application file for complete search history.

(56) References Cited

U.S. PATENT DOCUMENTS

| 4,765,297 | A | 8/1988 | Richter | |
|---|---|---|---|---|
| 2008/0035132 | A1* | 2/2008 | Katoh et al. | ................. 123/673 |
| 2009/0198434 | A1* | 8/2009 | Tanaka et al. | ................. 701/103 |
| 2010/0049419 | A1 | 2/2010 | Yoshikawa et al. | |

FOREIGN PATENT DOCUMENTS

| JP | 60-069243 | | 4/1985 |
|---|---|---|---|
| JP | 4-31647 | * | 2/1992 |
| JP | 2000-145516 | | 5/2000 |
| JP | 2003-41954 | | 2/2003 |
| JP | 2003-314347 | | 11/2003 |
| JP | 2006-250020 | | 9/2006 |
| JP | 2007-205194 | | 8/2007 |

OTHER PUBLICATIONS

Office Action dated Jun. 17, 2010 issued in corresponding Japanese Application No. 2008-046935 with an at least partial English-language version thereof.

* cited by examiner

*Primary Examiner*—Hai H Huynh
(74) *Attorney, Agent, or Firm*—Nixon & Vanderhye P.C.

(57) ABSTRACT

When either one of two injectors of each cylinder becomes abnormal, a control device performs failsafe control of performing increase correction of injection quantity of a normal injector. If actual injection quantity is restricted with the maximum injection quantity that can be injected by the normal injector during the execution of the failsafe control, the control device restricts duty of an actuator of an intake air quantity adjustment mechanism (such as a throttle opening degree), thereby restricting intake air quantity to intake air quantity that does not cause melting damage of a catalyst. Thus, increase of deviation of an air-fuel ratio toward a lean side can be inhibited, and the melting damage of the catalyst can be prevented.

12 Claims, 8 Drawing Sheets

CONTROL DEVICE OF INTERNAL COMBUSTION ENGINE

CROSS REFERENCE TO RELATED APPLICATION

This application is based on and incorporates herein by reference Japanese Patent Application No. 2008-46935 filed on Feb. 27, 2008.

BACKGROUND OF THE INVENTION

1. Field of the Invention

The present invention relates to a control device of an internal combustion engine having multiple injectors on an intake side of each of cylinders of the internal combustion engine respectively.

2. Description of Related Art

Patent document 1 (JP-A-S63-94057) describes a system that provides two injectors on an intake side of each cylinder of an internal combustion engine and that injects fuel into each cylinder by the two injectors, aiming at atomization of a fuel spray inside each cylinder of the internal combustion engine, reduction of port wetting (i.e., reduction of fuel adhesion to an intake port inner wall surface), and the like.

The inventors of the present invention are studying an abnormality diagnosis technology for specifying a cylinder causing an abnormal air-fuel ratio due to an abnormality in an injector in an internal combustion engine providing two injectors on an intake side of each cylinder respectively when either one of the two injectors of each cylinder becomes abnormal and for specifying which one of the two injectors of the abnormal cylinder is abnormal. During the process of the study, existence of following problems was newly found.

When either one of the two injectors of a certain cylinder becomes abnormal, the abnormal injector is specified and failsafe control is performed to prohibit an injection operation of the abnormal injector and to perform increase correction of injection quantity of the normal injector such that the fuel quantity equivalent to request injection quantity is injected only by the normal injector. In this case, it is necessary to inject the injection quantity of the two injectors (i.e., the request injection quantity) with the single normal injector. Therefore, there is a possibility that the injection quantity of the two injectors (i.e., the request injection quantity) exceeds the maximum injection quantity that can be injected by the single normal injector 21, but the actual injection quantity does not exceed the maximum injection quantity that can be injected by the single normal injector 21. However, intake air quantity is controlled to realize a target air-fuel ratio in accordance with the injection quantity of the two injectors (i.e., the request injection quantity). Therefore, if the actual injection quantity is restricted with the maximum injection quantity that can be injected by the single normal injector, the intake air quantity becomes excessive with respect to the actual injection quantity and the air-fuel ratio shifts toward a lean side. In the worst case, there is a possibility that a catalyst causes excessive temperature increase due to the lean air-fuel ratio, thereby causing catalyst melting damage.

SUMMARY OF THE INVENTION

It is an object of the present invention to provide a control device of an internal combustion engine having multiple injectors on an intake side of each cylinder, the control device being capable of inhibiting increase of deviation of an air-fuel ratio toward a lean side and of preventing melting damage of a catalyst when actual injection quantity is restricted with the maximum injection quantity that can be injected by a single normal injector during execution of failsafe control, which is executed to perform increase correction of injection quantity of the normal injector when an abnormality occurs in either one of the injectors.

According to an aspect of the present invention, a control device of an internal combustion engine having a plurality of injectors provided on an intake side of each of a plurality of cylinders of the internal combustion engine has an abnormality diagnosis section and a failsafe control section. The abnormality diagnosis section specifies an abnormal injector when either one of the plurality of injectors of either one of the cylinders becomes abnormal. The failsafe control section performs failsafe control of prohibiting an injection operation of the injector specified to be abnormal by the abnormality diagnosis section and of performing increase correction of injection quantity of a normal injector such that fuel quantity equivalent to request injection quantity is injected only by the normal injector. The failsafe control section restricts intake air quantity when the request injection quantity exceeds the maximum injection quantity that can be injected by the normal injector during execution of the failsafe control.

With such the construction, in the internal combustion engine having the multiple injectors on the intake side of each cylinder, the intake air quantity can be restricted when the actual injection quantity is restricted with the maximum injection quantity that can be injected by the normal injector during the execution of the failsafe control, which is executed to perform the increase correction of the injection quantity of the normal injector when the abnormality occurs in either one of the injectors. As a result, the increase of the deviation of the air-fuel ratio toward the lean side can be inhibited, and the melting damage of the catalyst can be prevented.

According to another aspect of the present invention, the failsafe control section restricts the intake air quantity during the execution of the failsafe control by restricting at least one of a throttle opening degree, an intake valve lift amount, intake valve timing (or a valve overlap amount), an EGR valve opening degree and an airflow control valve with a guard value.

For example, the intake air quantity may be directly restricted by restricting the throttle opening degree or the intake valve lift amount with the guard value. Alternatively, an internal EGR rate or an external EGR rate may be increased by restricting the intake valve timing (or the valve overlap amount) or the EGR valve opening degree with the guard value, thereby indirectly restricting the intake air quantity. The airflow control valve is a swirl control valve or a tumble control valve. The intake air quantity can be restricted by closing the airflow control valve.

According to another aspect of the present invention, the control device further has an airflow meter for sensing the intake air quantity. The failsafe control section performs feedback control of at least one of the throttle opening degree, the intake valve lift amount, the intake valve timing, the EGR valve opening degree and the airflow control valve such that a sensing value of the airflow meter coincides with a target restriction value when the failsafe control section restricts the intake air quantity.

Thus, control accuracy of the intake air quantity during the restriction of the intake air quantity can be improved.

In this case, there is a delay in an intake system before the intake air having passed the airflow meter is suctioned into the cylinder. Therefore, in consideration of this point, according to another aspect of the present invention, the failsafe control section performs feedback control of at least one of the throttle opening degree, the intake valve lift amount, the intake valve timing, the EGR valve opening degree and the airflow control valve such that correction air quantity obtained by applying phase lead correction to a sensing value of the airflow meter coincides with a target restriction value when the failsafe control section restricts the intake air quantity.

With such the construction, the response delay of the sensing value of the airflow meter is compensated, and the feedback control can be performed by estimating the air quantity actually suctioned into the cylinder. Accordingly, the influence of the response delay of the sensing value of the airflow meter can be eliminated, and the intake air quantity can be restricted with high accuracy.

According to yet another aspect of the present invention, the control device further has an intake pipe pressure sensor for sensing intake pipe pressure. The failsafe control section performs feedback control of at least one of the throttle opening degree, the intake valve lift amount, the intake valve timing, the EGR valve opening degree and the airflow control valve such that a sensing value of the intake pipe pressure sensor coincides with a target restriction value when the failsafe control section restricts the intake air quantity.

Also with such the construction, the control accuracy of the intake air quantity during the restriction of the intake air quantity can be improved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, five embodiments of the present invention will be described with reference to the drawings.

A first embodiment of the present invention will be described with reference to FIGS. 1 to 4. First, a general configuration of an entire engine control system will be explained with reference to FIG. 1. An air cleaner 13 is provided in the most upstream portion of an intake pipe 12 of an engine 11 (an internal combustion engine). An airflow meter 14 for sensing intake air quantity is provided downstream of the air cleaner 13. A throttle valve 16, whose opening degree is regulated by a motor 15, and a throttle position sensor 17 for sensing an opening degree (a throttle opening degree) of the throttle valve 16 are provided downstream of the airflow meter 14.

Figure 1:
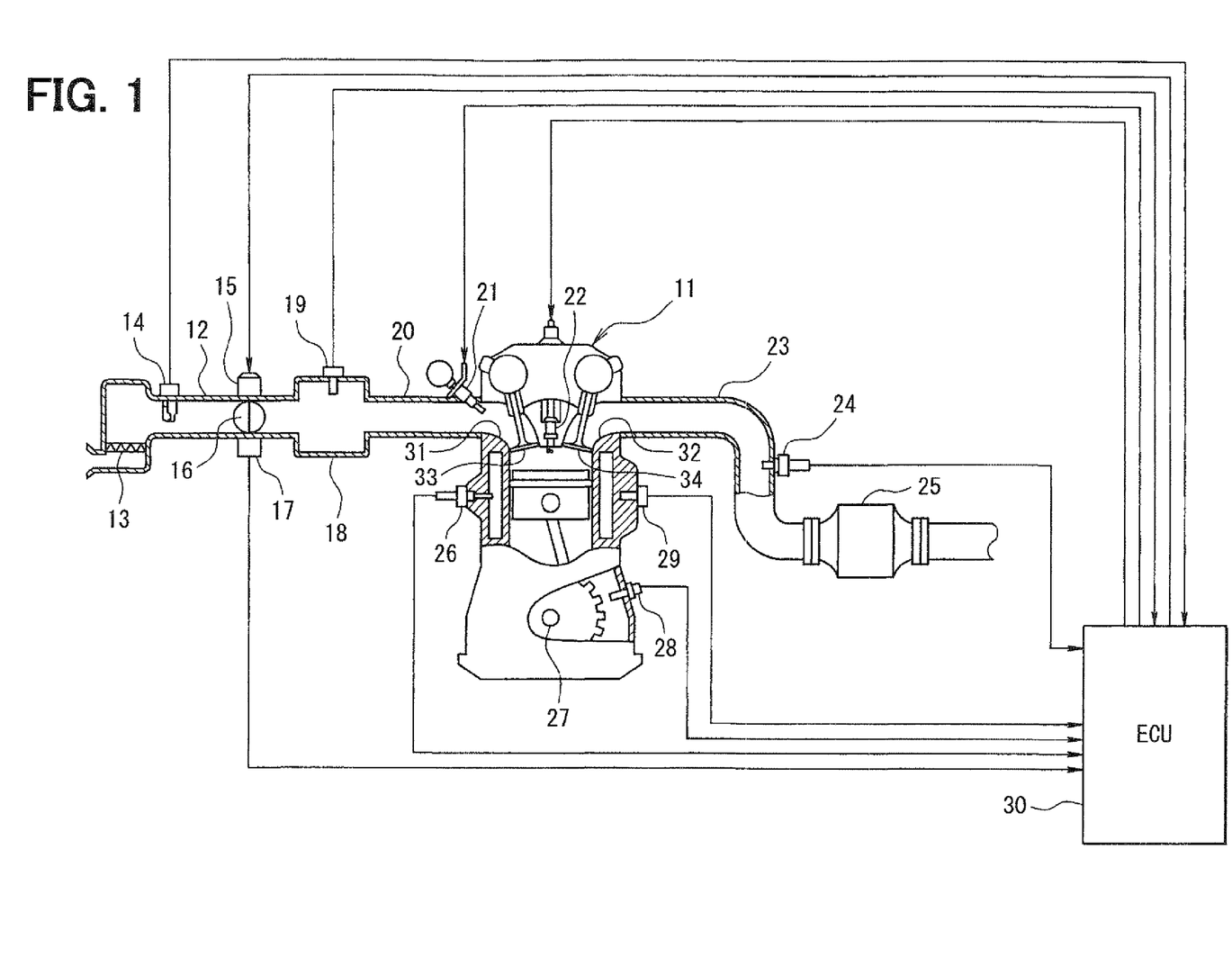
FIG. 1 is a schematic configuration diagram showing an engine control system according to a first embodiment of the present invention.

A surge tank 18 is provided downstream of the throttle valve 16, and an intake pipe pressure sensor 19 for sensing intake pipe pressure is provided to the surge tank 18. An intake manifold 20 for introducing an air into each cylinder of the engine 11 is provided to the surge tank 18. An injector 21 for injecting fuel is attached to or near an intake port 31 connected to the intake manifold 20 of each cylinder. Spark plugs 22 are attached to a cylinder head of the engine 11 for the respective cylinders for igniting a fuel air mixture in the cylinders with spark discharge from the respective spark plugs 22.

Figure 2:
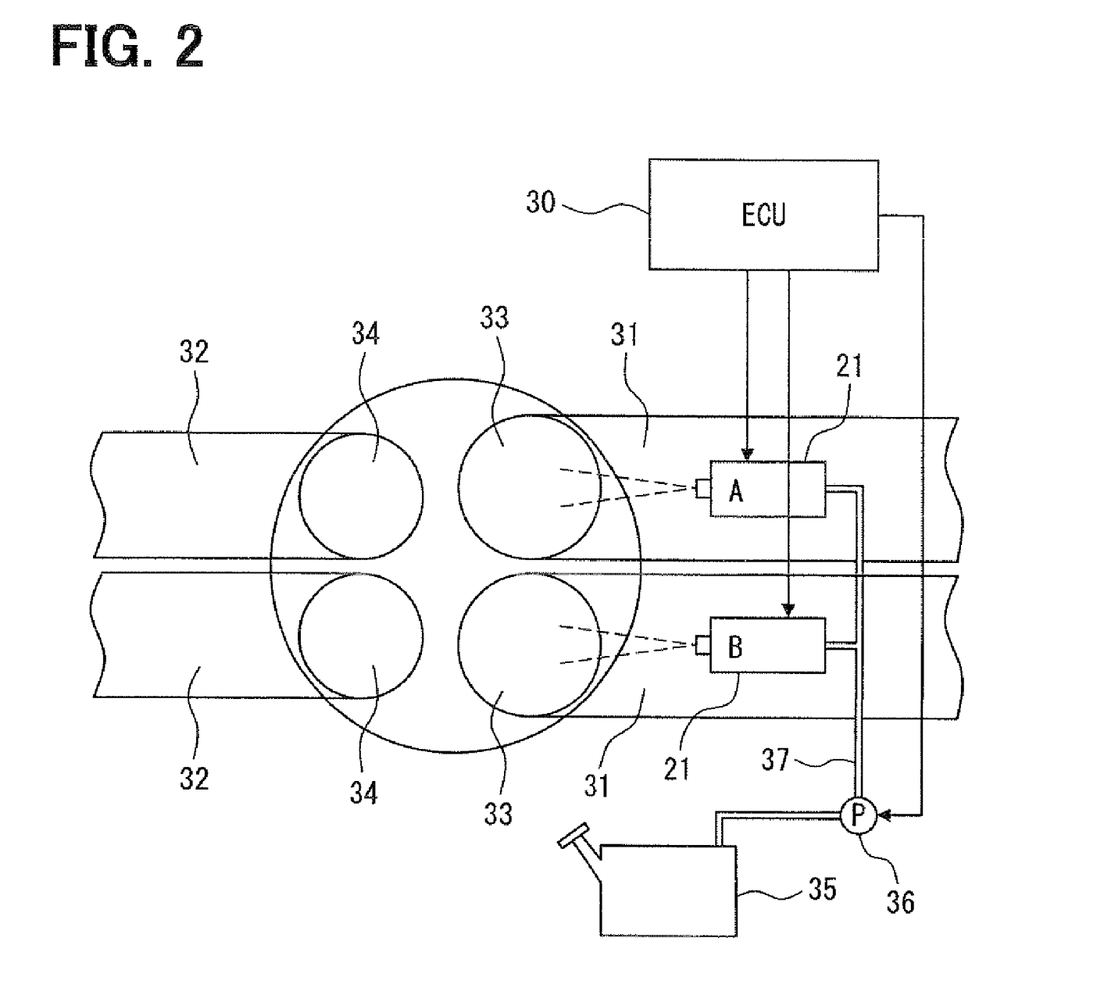
FIG. 2 is a schematic configuration diagram showing two injectors provided to a cylinder and a vicinity thereof according to the first embodiment.

As shown in FIG. 2, the two intake ports 31 and two exhaust ports 32 are provided for each cylinder of the engine 11 respectively, for example. The two injectors 21 are provided in or near the two intake ports 31 of each cylinder respectively. Each intake port 31 is opened and closed with an intake valve 33. Each exhaust port 32 is opened and closed by an exhaust valve 34. The fuel stored in a fuel tank 35 is drawn by a fuel pump 36. The fuel discharged from the fuel pump 36 is supplied to the injector 21 of each cylinder through a fuel supply pipe 37.

As shown in FIG. 1, an exhaust gas sensor 24 (an air-fuel ratio sensor, an oxygen sensor, or the like) for sensing an air-fuel ratio, a rich/lean state or the like of exhaust gas is provided in an exhaust pipe 23 of the engine 11. A catalyst 25 such as a three-way catalyst for purifying the exhaust gas is provided downstream of the exhaust gas sensor 24.

A coolant temperature sensor 26 for sensing coolant temperature and a knock sensor 29 for sensing knocking vibration are attached to a cylinder block of the engine 11. A crank angle sensor 28 is provided adjacent to an outer periphery of a crankshaft 27 and outputs a pulse signal every time the crankshaft 27 rotates by a predetermined crank angle. A crank angle and engine rotation speed are sensed based on an output signal of the crank angle sensor 28.

Outputs of the above various sensors are inputted to an engine control circuit 30 (referred to as an ECU, hereinafter). The ECU 30 is structured mainly by a microcomputer. The ECU 30 executes various kinds of engine control programs stored in an incorporated ROM (a storage medium) to control fuel injection quantity of the injector 21 and ignition timing of the spark plug 22 according to an engine operation condition. Normally, the two injectors 21 provided to each cylinder are controlled such that a ratio between the injection quantities of the two injectors 21 is 50:50. Alternatively, the ratio of the injection quantity may be changed in accordance with the engine operation condition.

The ECU 30 executes an injector abnormality diagnosis routine of FIG. 3 explained in detail later. Thus, when the ECU 30 performs abnormality diagnosis of the injector 21, the ECU 30 causes the two injectors 21 of each cylinder to perform the injection one by one in a switched manner and determines existence or nonexistence of torque fluctuation (or fluctuation of a combustion state). The ECU 30 specifies the abnormal injector 21 out of the two injectors 21 based on the determination result. Moreover, the ECU 30 executes a failsafe control routine of FIG. 4 explained in detail later. Thus, the ECU 30 performs failsafe control of prohibiting an injection operation of the injector 21 specified to be abnormal by the abnormality diagnosis and performing increase correction of the injection quantity of the normal injector 21 such that the fuel quantity equivalent to request injection quantity is injected only by the normal injector 21.

When the failsafe control is performed, it is necessary to inject the injection quantity of the two injectors (i.e., the request injection quantity) by the single normal injector 21. Therefore, there is a possibility that the injection quantity of the two injectors (i.e., the request injection quantity) exceeds the maximum injection quantity that can be injected by the single normal injector 21, but the actual injection quantity does not exceed the maximum injection quantity that can be injected by the single normal injector 21. However, intake air quantity is controlled to realize a target air-fuel ratio in accordance with the injection quantity of the two injectors (i.e., the request injection quantity). Therefore, if the actual injection quantity is restricted with the maximum injection quantity that can be injected by the single normal injector 21, the intake air quantity becomes excessive with respect to the actual injection quantity and the air-fuel ratio shifts toward a lean side. In the worst case, there is a possibility that the catalyst 25 causes excessive temperature increase due to the lean air-fuel ratio, thereby causing catalyst melting damage.

As measures against the problem, according to the first embodiment, when the request injection quantity exceeds the maximum injection quantity that can be injected by the normal injector 21 when the failsafe control is performed, the intake air quantity is restricted. Hereafter, one of the two injectors 21 provided to each cylinder is referred to as an injector A, and the other one is referred to as an injector B.

Figure 3:
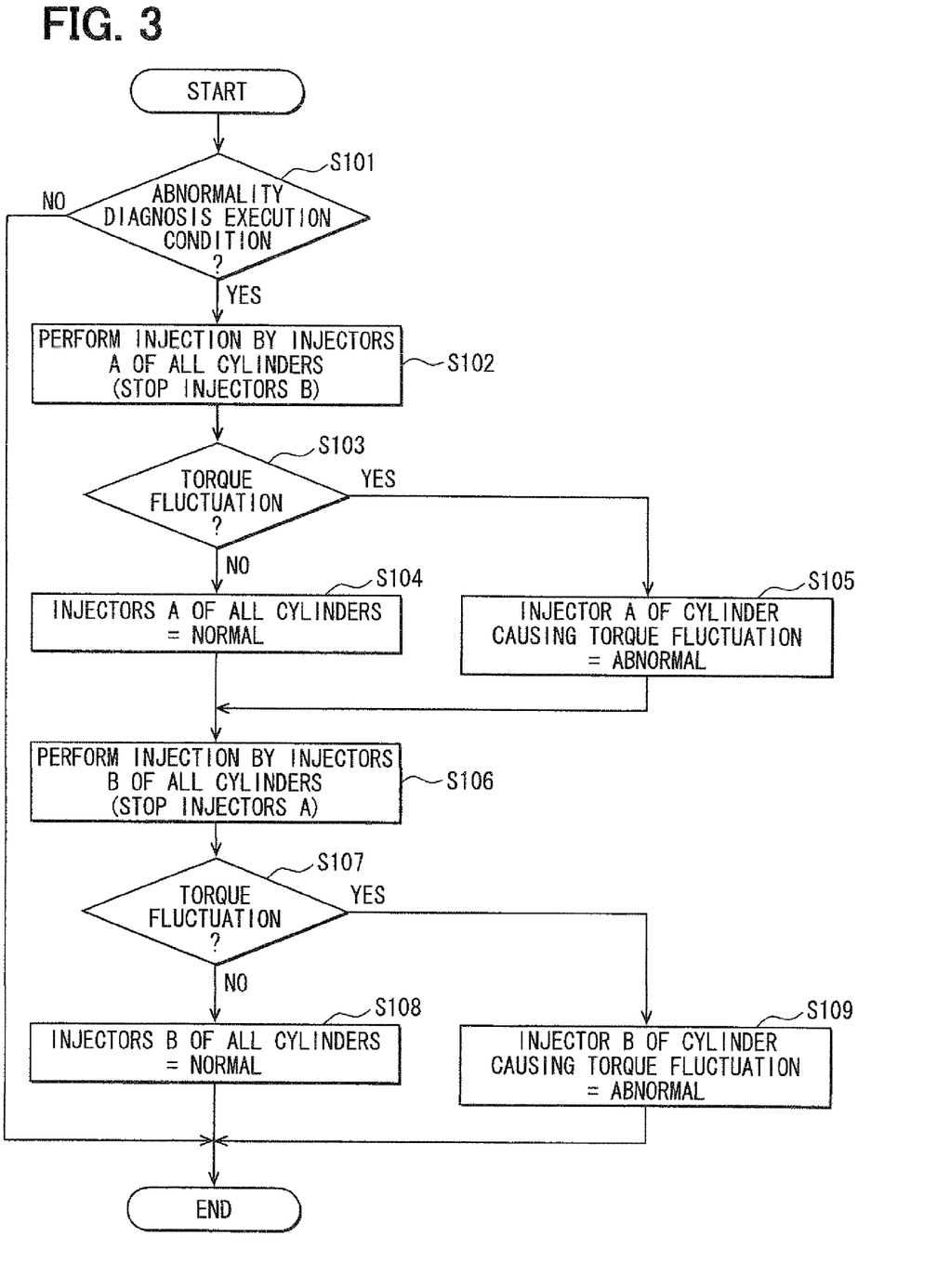
FIG. 3 is a flowchart illustrating a processing flow of an injector abnormality diagnosis routine according to the first embodiment.

The injector abnormality diagnosis routine shown in FIG. 3 is executed in a predetermined cycle during the engine operation and functions as an abnormality diagnosis section. If the routine is started, first in S101 it is determined whether an abnormality diagnosis execution condition is satisfied. For example, the abnormality diagnosis execution condition includes (1) a condition that idle operation (or steady operation) is in execution, (2) a condition that warming-up of the engine 11 has been completed, and (3) a condition that no abnormality has been detected in an engine control system except the injectors A, B. The abnormality diagnosis execution condition is satisfied if all the conditions (1) to (3) are satisfied. The abnormality diagnosis execution condition is not satisfied if at least one of the conditions (1) to (3) is not satisfied.

If it is determined in S101 that the abnormality diagnosis execution condition is not satisfied, the routine is ended without performing subsequent processing. If it is determined that the abnormality diagnosis execution condition is satisfied, the process proceeds to S102, where injection of the injectors A of all the cylinders is permitted, and injection of the other injectors B of all the cylinders is prohibited. The injection of the injectors A of all the cylinders is performed in series.

Then, the process proceeds to S103, where it is determined whether the torque fluctuation (or the fluctuation of the combustion state) has occurred. As for the determination method of the torque fluctuation (or the fluctuation of the combustion state), for example, the torque fluctuation (or the fluctuation of the combustion state) may be determined based on at least one of a fluctuation amount of the engine rotation speed, cylinder pressure (combustion pressure) sensed with a cylinder pressure sensor (not shown) of each cylinder and the air-fuel ratio of the exhaust gas sensed with the exhaust gas sensor 24. Alternatively, ion current generated with combustion of the mixture gas may be sensed with the spark plug 22 or the like, and the fluctuation of the combustion state may be determined based on the ion current.

If it is determined in S103 that the torque fluctuation (or the fluctuation of the combustion state) has not occurred, the process proceeds to S104, where it is determined that the injectors A of all the cylinders are normal. If it is determined in S103 that the torque fluctuation (or the fluctuation of the combustion state) has occurred, the process proceeds to S105, where it is determined that the injector A of the cylinder causing the torque fluctuation (or the fluctuation of the combustion state) is abnormal.

Then, the process proceeds to S106, where the injection of the other injectors B of all the cylinders is permitted, and the injection of the injectors A of all the cylinders is prohibited. The injection of the injectors B of all the cylinders is performed in series.

Then, the process proceeds to S107, where it is determined whether the torque fluctuation (or the fluctuation of the combustion state) has occurred using the same method as S103. If it is determined in S107 that the torque fluctuation (or the fluctuation of the combustion state) has not occurred, the process proceeds to S108, where it is determined that the other injectors B of all the cylinders are normal.

If it is determined in S107 that the torque fluctuation (or the fluctuation of the combustion state) has occurred, the process proceeds to S109, where it is determined that the other injector B of the cylinder causing the torque fluctuation (or the fluctuation of the combustion state) is abnormal.

Figure 4:
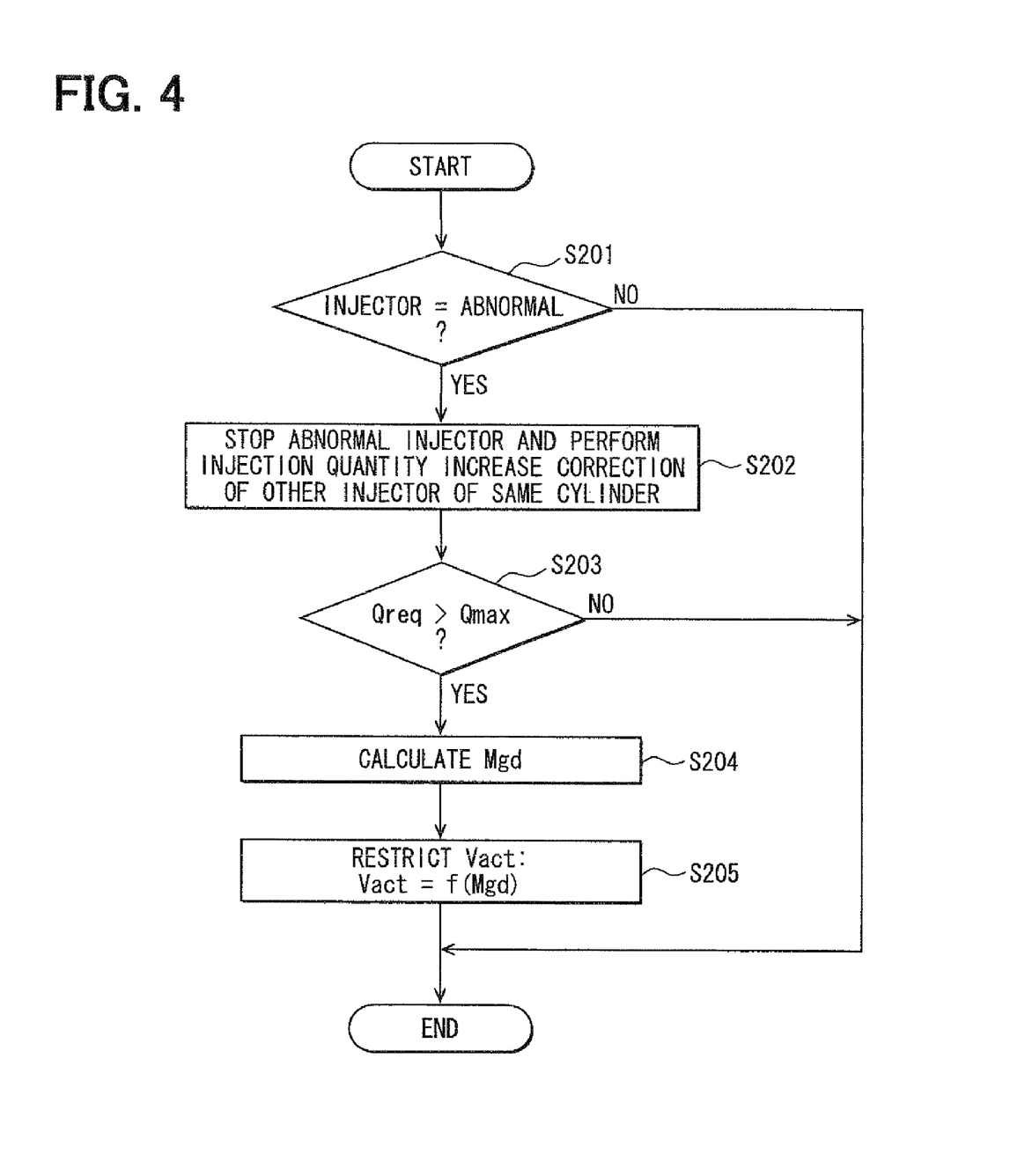
FIG. 4 is a flowchart illustrating a processing flow of a failsafe control routine according to the first embodiment.

The failsafe control routine shown in FIG. 4 is executed in a predetermined cycle during the engine operation and functions as a failsafe control section. When the routine is started, first in S201, it is determined whether either one of the two injectors A, B of each cylinder is abnormal based on the processing result of the above-described injector abnormality diagnosis routine of FIG. 3. If both of the injectors A, B of each cylinder are normal, the routine is ended without performing subsequent processing.

If it is determined in S201 that either one of the two injectors A, B is abnormal, the process proceeds to S202. In S202, the injection operation of the abnormal injector 21 is stopped. Moreover, in order to inject the fuel quantity equivalent to the request injection quantity only with the other normal injector 21 of the same cylinder, increase correction for increasing the injection quantity of the normal injector 21 by the injection quantity equivalent to the injection quantity of the abnormal injector 21 (i.e., the injector 21 prohibited from performing the injection) is performed.

Then, the process proceeds to S203, where it is determined whether the request injection quantity Qreq is greater than the maximum injection quantity Qmax that can be injected with the normal injector 21. If the request injection quantity Qreq is equal to or less than the maximum injection quantity Qmax that can be injected with the normal injector 21, the routine is ended immediately. This is because the fuel quantity equivalent to the request injection quantity Qreq can be injected (that is, the actual injection quantity is not restricted) when the request injection quantity Qreq is equal to or less than the maximum injection quantity Qmax that can be injected with the normal injector 21. In this case, the intake air quantity does not become excessive with respect to the actual injection quantity and the air-fuel ratio does not shift to the lean side.

If it is determined in S203 that the request injection quantity Qreq is greater than the maximum injection quantity Qmax that can be injected with the normal injector 21, it is determined that the actual injection quantity is restricted with the maximum injection quantity Qmax that can be injected by the normal injector 21 and the process proceeds to S204. In S204, the intake air quantity Mgd that does not cause the melting damage of the catalyst 25 is calculated based on a map or the like in accordance with the actual injection quantity (i.e., the maximum injection quantity Qmax that can be injected by the normal injector 21), the engine rotation speed and the like.

Then, the process proceeds to S205, where a duty Vact (a controlled variable) of an actuator, which drives an intake air quantity adjustment mechanism for adjusting the intake air quantity (for example, at least one of the throttle opening degree, an intake valve lift amount, intake valve timing, an EGR valve opening degree and an airflow control valve), is restricted based on a map or the like in accordance with the intake air quantity Mgd that does not cause the melting damage of the catalyst 25 (i.e., Vact=f(Mgd)). Thus, the intake air quantity is restricted to the intake air quantity Mgd that does not cause the melting damage of the catalyst 25.

In the restriction, for example, the intake air quantity may be restricted directly with the throttle opening degree or the intake valve lift amount. Alternatively, the intake air quantity may be restricted indirectly by increasing an internal EGR rate or an external EGR rate with the intake valve timing (or a valve overlap amount) or the EGR valve opening degree. The airflow control valve is a swirl control valve or a tumble control valve. The intake air quantity can be restricted by closing the airflow control valve.

According to the above-described first embodiment, when either one of the two injectors 21 of each cylinder becomes abnormal, the failsafe control for performing the increase correction of the injection quantity of the normal injector 21 is performed. In the case where the actual injection quantity is restricted by the maximum injection quantity Qmax that can be inject by the normal injector 21 when the failsafe control is performed, the duty Vact of the actuator of the intake air quantity adjustment mechanism is restricted to restrict the intake air quantity to the intake air quantity Mgd that does not cause the melting damage of the catalyst 25. As a result, increase of the deviation of the air-fuel ratio toward the lean side can be inhibited, and the melting damage of the catalyst 25 can be prevented.

Figure 5:
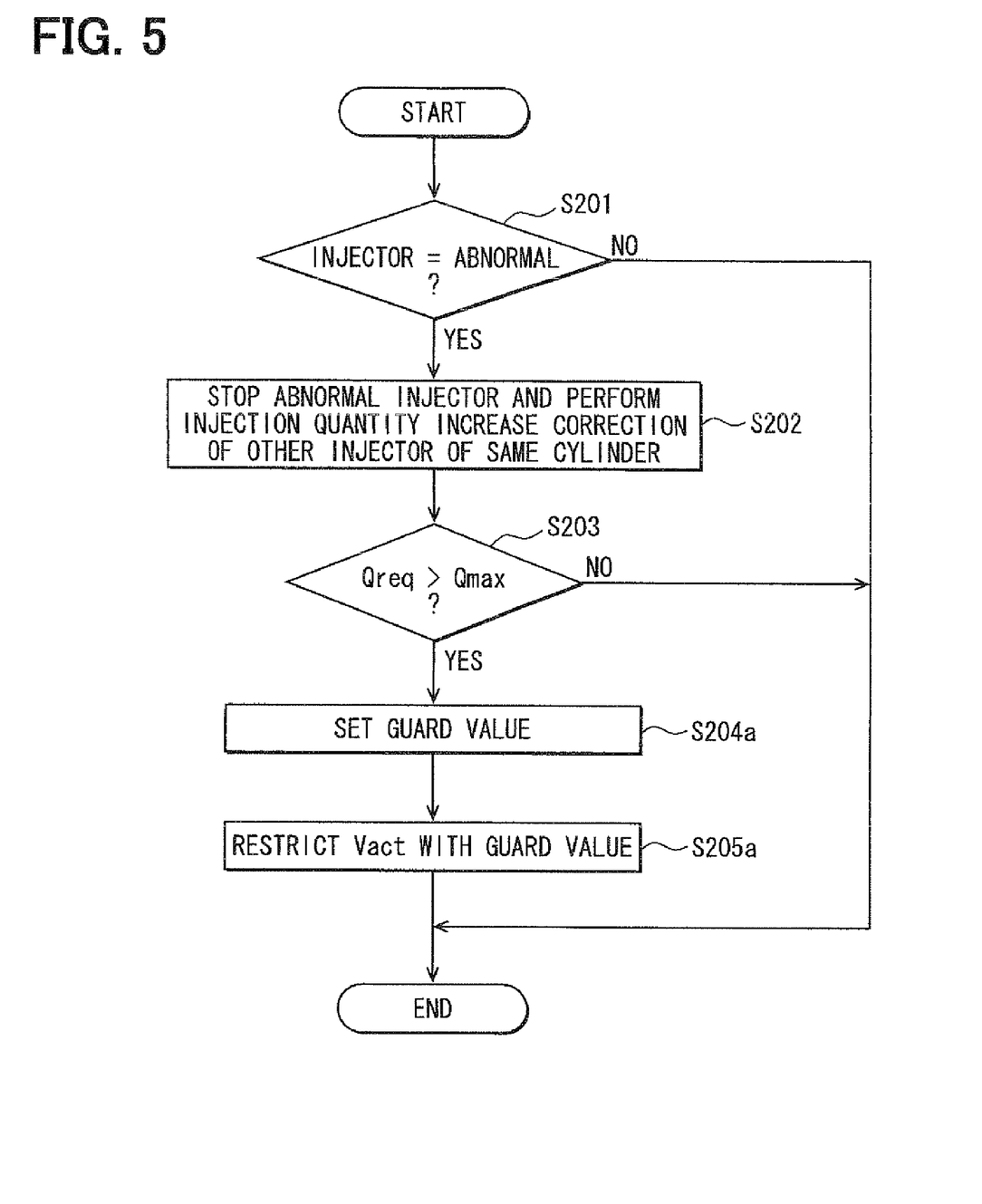
FIG. 5 is a flowchart illustrating a processing flow of a failsafe control routine according to a second embodiment of the present invention.

Next, a second embodiment of the present invention will be described. In the above-described first embodiment, the duty Vact of the actuator of the intake air quantity adjustment mechanism is restricted with the use of the map or the like in accordance with the intake air quantity Mgd that does not cause the melting damage of the catalyst 25. According to the second embodiment, a failsafe control routine of FIG. 5 is executed to restrict the duty Vact of the actuator of the intake air quantity adjustment mechanism with a guard value, thereby restricting the intake air quantity to the intake air quantity Mgd that does not cause the melting damage of the catalyst 25. The failsafe control routine of FIG. 5 includes processing of S204a and S205a replacing the processing of S204 and S205 of the failsafe control routine of FIG. 4. The other processing is unchanged from the first embodiment.

According to the second embodiment, if it is determined in S203 that the request injection quantity Qreq exceeds the maximum injection quantity Qmax that can be injected by the normal injector 21 during the execution of the failsafe control, the process proceeds to S204a. In S204a, a guard value for the duty Vact of the actuator that drives the intake air quantity adjustment mechanism (for example, at least one of the throttle opening degree, the intake valve lift amount, the intake valve timing, the EGR valve opening degree and the airflow control valve) is set. The guard value may be a preset single guard value. Alternatively, multiple preset guard values may be switched and used in accordance with the engine rotation speed and the like.

Then, the process proceeds to S205a, where the duty Vact of the actuator of the intake air quantity adjustment mechanism is restricted with the guard value, thereby restricting the intake air quantity to the intake air quantity Mgd that does not cause the melting damage of the catalyst 25. The above-described second embodiment also exerts the effects similar to those of the first embodiment.

Next, a third embodiment of the present invention will be described. A failsafe control routine of FIG. 6 executed in the third embodiment includes processing of S206 to S209 added after S205 of the failsafe control routine of FIG. 4. The other processing is unchanged from the first embodiment.

Figure 6:
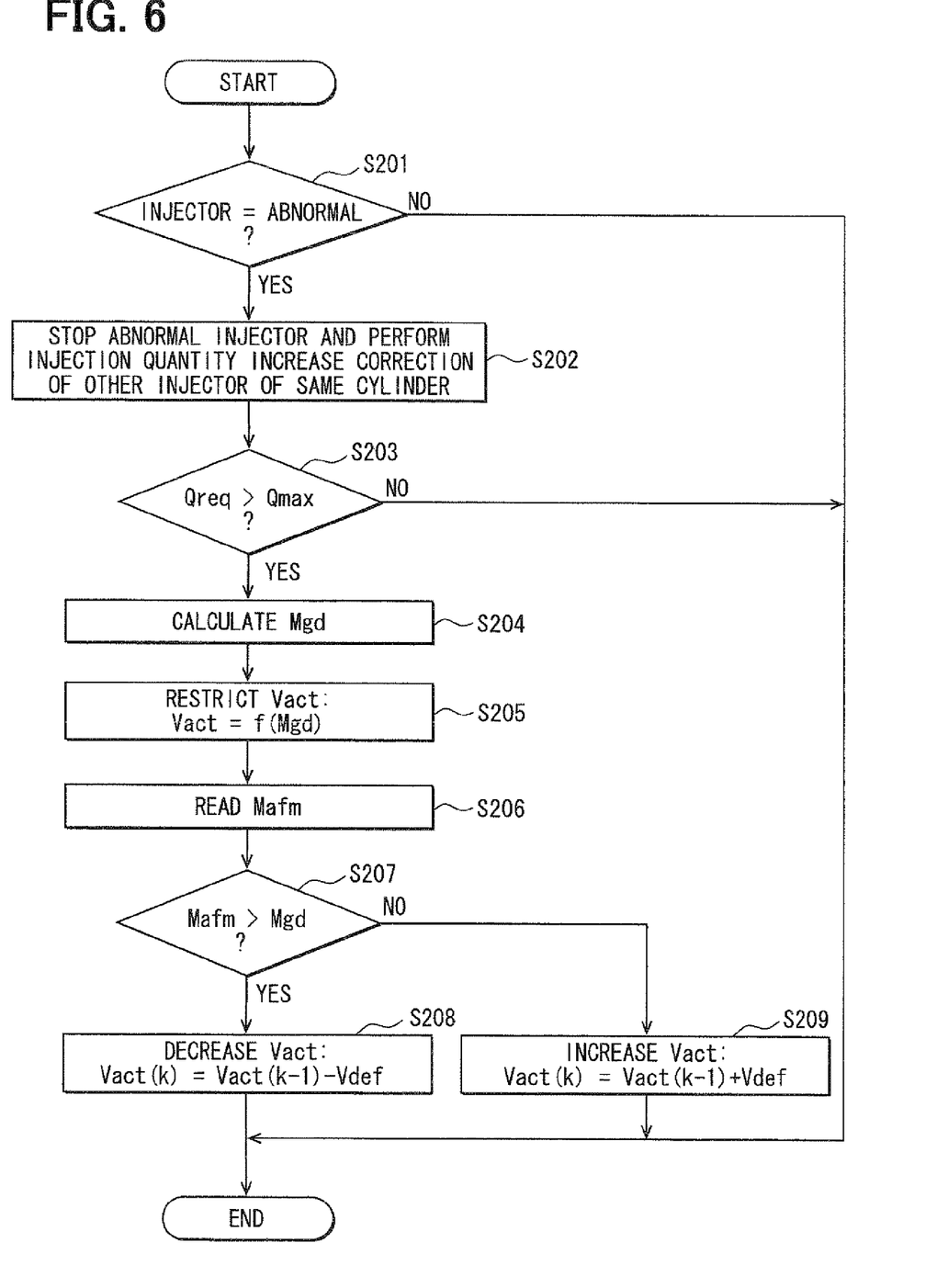
FIG. 6 is a flowchart illustrating a processing flow of a failsafe control routine according to a third embodiment of the present invention.

In the failsafe control routine of FIG. 6, the intake air quantity Mgd that does not cause the melting damage of the catalyst 25 is calculated (in S204) during the execution of the failsafe control. The duty Vact of the actuator of the intake air quantity adjustment mechanism is restricted in accordance with the intake air quantity Mgd (in S205). The intake air quantity Mafm sensed with the airflow meter 14 is read in S206. In next S207, the intake air quantity Mafm sensed with the airflow meter 14 is compared with the intake air quantity Mgd that does not cause the melting damage of the catalyst 25. If the intake air quantity Mafm sensed with the airflow meter 14 is larger than the intake air quantity Mgd that does not cause the melting damage of the catalyst 25, the process proceeds to S208. In S208, the duty Vact of the actuator of the intake air quantity adjustment mechanism is decreased from a preceding value Vact(k−1) by a predetermined amount Vdef (i.e., Vact(k)=Vact(k−1)−Vdef).

If the intake air quantity Mafm sensed with the airflow meter 14 is smaller than the intake air quantity Mgd that does not cause the melting damage of the catalyst 25, the process proceeds to S209. In S209, the duty Vact of the actuator of the intake air quantity adjustment mechanism is increased from the preceding value Vact(k−1) by the predetermined amount Vdef (i.e., Vact(k)=Vact(k−1)+Vdef).

The above processing is repeated to perform feedback control of the duty Vact of the actuator of the intake air quantity adjustment mechanism such that the intake air quantity Mafm sensed with the airflow meter 14 coincides with the intake air quantity Mgd that does not cause the melting damage of the catalyst 25. Thus, the intake air quantity can be accurately controlled to the intake air quantity Mgd that does not cause the melting damage of the catalyst 25.

Next, a fourth embodiment of the present invention will be explained. A failsafe control routine of FIG. 7 executed in the fourth embodiment includes processing of S206a added after S206 of the failsafe control routine of FIG. 6 and includes determination processing of S207a replacing the determination processing of S207 of FIG. 6. The other processing is unchanged from the third embodiment.

Figure 7:
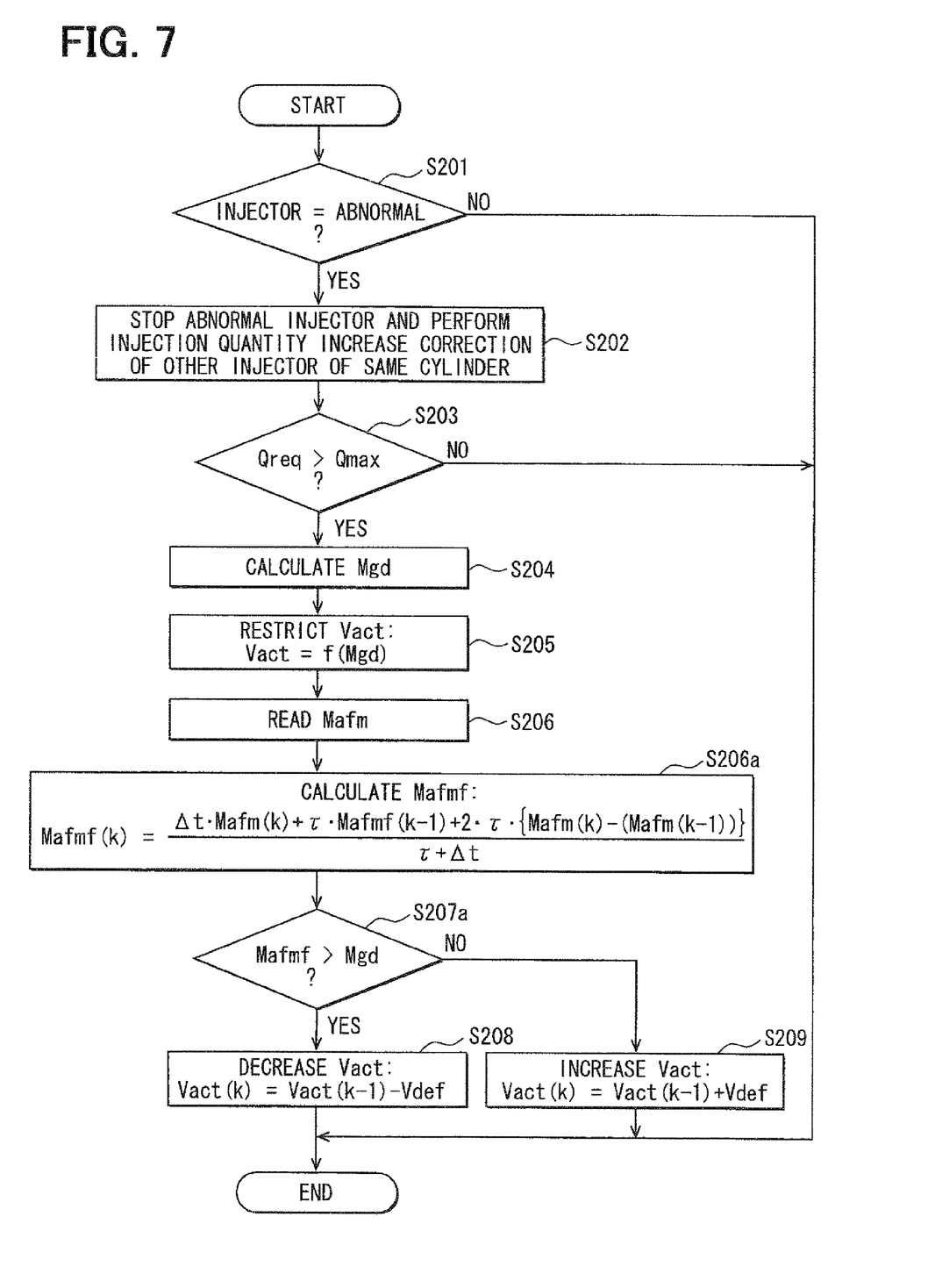
FIG. 7 is a flowchart illustrating a processing flow of a failsafe control routine according to a fourth embodiment of the present invention.

In the failsafe control routine of FIG. 7, when the duty Vact of the actuator of the intake air quantity adjustment mechanism is restricted in accordance with the intake air quantity Mgd that does not cause the melting damage of the catalyst 25 during the execution of the failsafe control, the intake air quantity Mafm sensed with the airflow meter 14 is read in S206. Then, in next S206a, in consideration of existence of a delay in an intake system before the intake air having passed through the airflow meter 14 is suctioned into the cylinder, phase lead compensation of the intake air quantity Mafm sensed with the airflow meter 14 is performed by the delay of the intake system, and phase lead compensation intake air quantity Mafmf is calculated by a following formula.

$$Mafmf(k)=\{\Delta t \cdot Mafm(k)+\tau \cdot Mafmf(k-1)+2\tau(Mafm(k)-Mafm(k-1)\}/(\tau+\Delta t)$$

In the formula, τ represents an intake system delay time constant, and Δt is a calculation cycle. The above formula is derived from an inverse model of an intake system model simulating the delay of the intake system before the intake air having passed the airflow meter 14 is suctioned into the cylinder.

Then, the process proceeds to S207a, where the phase lead compensation intake air quantity Mafmf is compared with the intake air quantity Mgd that does not cause the melting damage of the catalyst 25. If the phase lead compensation intake air quantity Mafmf is larger than the intake air quantity Mgd that does not cause the melting damage of the catalyst 25, the process proceeds to S208. In S208, the duty Vact of the actuator of the intake air quantity adjustment mechanism is decreased from a preceding value Vact(k−1) by a predetermined amount Vdef (i.e., Vact(k)=Vact(k−1)−Vdef).

If the phase lead compensation intake air quantity Mafmf is smaller than the intake air quantity Mgd that does not cause the melting damage of the catalyst 25, the process proceeds to S209. In S209, the duty Vact of the actuator of the intake air quantity adjustment mechanism is increased from the preceding value Vact(k−1) by the predetermined amount Vdef (i.e., Vact(k)=Vact(k−1)+Vdef).

The above processing is repeated to perform feedback control of the duty Vact of the actuator of the intake air quantity adjustment mechanism such that the phase lead compensation intake air quantity Mafmf coincides with the intake air quantity Mgd that does not cause the melting damage of the catalyst 25.

With such the construction, the phase lead compensation of the intake air quantity Mafm sensed with the airflow meter 14 is performed by the delay of the intake system, and the feedback control can be performed by estimating the air quantity actually suctioned into the cylinder (i.e., the phase lead compensation intake air quantity Mafmf). Therefore, the influence of the response delay of the intake air quantity Mafm sensed with the airflow meter 14 can be eliminated, and the intake air quantity can be controlled to the intake air quantity Mgd that does not cause the melting damage of the catalyst 25 with higher accuracy.

Next, a fifth embodiment of the present invention will be described. A failsafe control routine of FIG. 8 executed in the fifth embodiment includes processing of S204b to S207b replacing the processing of S204 to S207 of the failsafe control routine of FIG. 6. The other processing is unchanged from the third embodiment.

Figure 8:
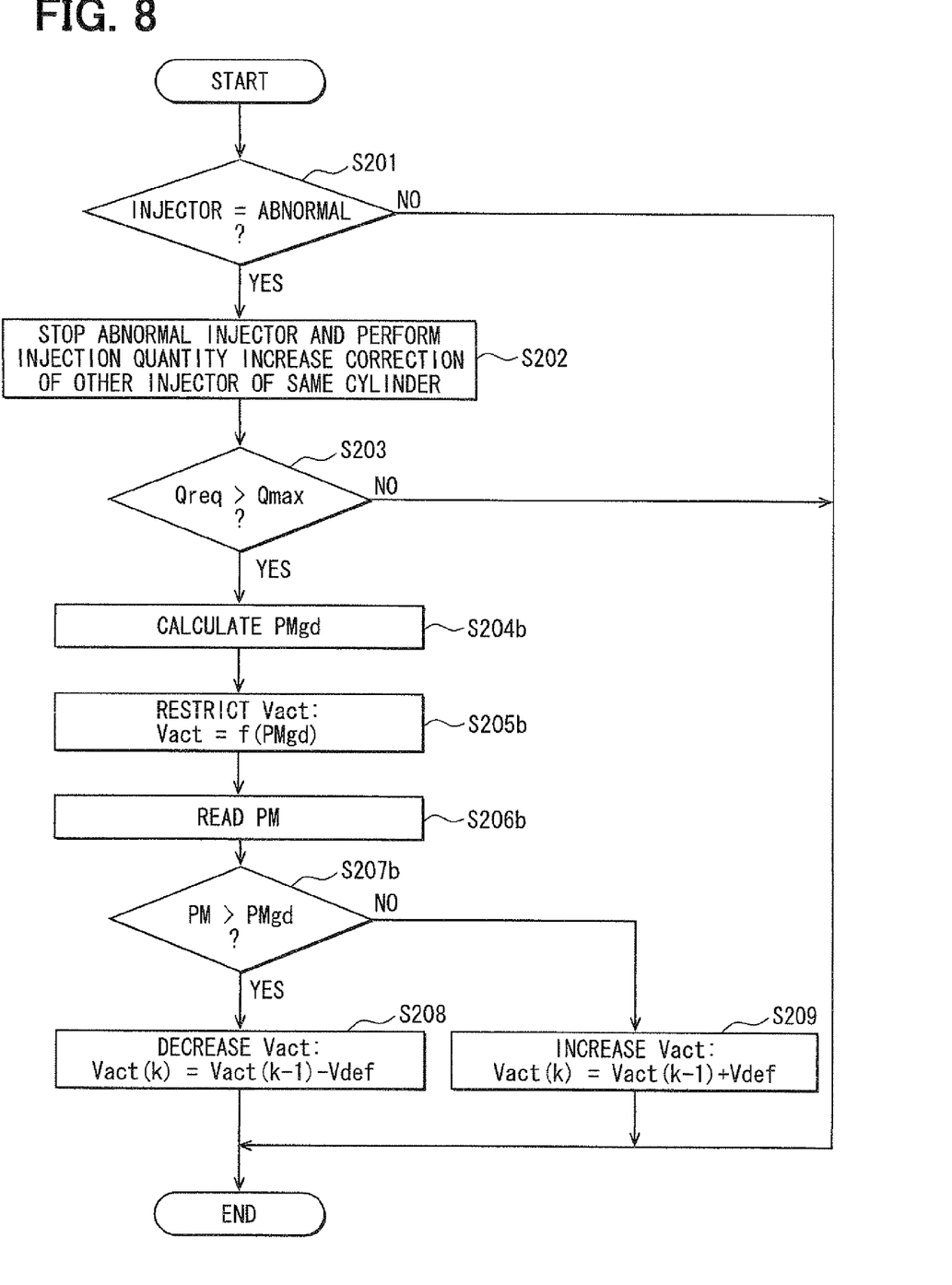
FIG. 8 is a flowchart illustrating a processing flow of a failsafe control routine according to a fifth embodiment of the present invention.

In the failsafe control routine of FIG. 8, if it is determined in S203 that the request injection quantity Qreq exceeds the maximum injection quantity Qmax that can be injected by the normal injector 21 during the execution of the failsafe control, the process proceeds to S204b. In S204b, intake pipe pressure PMgd that does not cause the melting damage of the catalyst 25 is calculated based on a map or the like in accordance with the actual injection quantity (i.e., the maximum injection quantity Qmax that can be injected by the normal injector 21), the engine rotation speed and the like.

Then, the process proceeds to S205b, where the duty Vact of the actuator, which drives the intake air quantity adjustment mechanism (for example, at least one of the throttle opening degree, the intake valve lift amount, the intake valve timing, the EGR valve opening degree and the airflow control valve), is restricted based on a map or the like in accordance with the intake pipe pressure PMgd that does not cause the melting damage of the catalyst 25. Thus, the intake air quantity is controlled to achieve the intake pipe pressure PMgd that does not cause the melting damage of the catalyst 25 (i.e., Vact=f(PMgd)). The intake pipe pressure PMgd is intake pipe pressure at the time when the intake air quantity is restricted to the intake air quantity that does not cause the melting damage of the catalyst 25.

Then, the process proceeds to S206b, where the intake pipe pressure PM sensed with the intake pipe pressure sensor 19 is read. In next S207b, the intake pipe pressure PM sensed with the intake pipe pressure sensor 19 is compared with the intake pipe pressure PMgd that does not cause the melting damage of the catalyst 25. If the intake pipe pressure PM sensed with the intake pipe pressure sensor 19 is higher than the intake pipe pressure PMgd that does not cause the melting damage of the catalyst 25, the process proceeds to S208. In S208, the duty Vact of the actuator of the intake air quantity adjustment mechanism is decreased from the preceding value Vact(k−1) by the predetermined amount Vdef (i.e., Vact(k)=Vact(k−1)−Vdef).

If the intake pipe pressure PM sensed with the intake pipe pressure sensor 19 is lower than the intake pipe pressure PMgd that does not cause the melting damage of the catalyst 25, the process proceeds to S209. In S209, the duty Vact of the actuator of the intake air quantity adjustment mechanism is increased from the preceding value Vact(k−1) by the predetermined amount Vdef (i.e., Vact(k)=Vact(k−1)+Vdef).

The above processing is repeated to perform feedback control of the duty Vact of the actuator of the intake air quantity adjustment mechanism such that the intake pipe pressure PM sensed with the intake pipe pressure sensor 19 coincides with the intake pipe pressure PMgd that does not cause the melting damage of the catalyst 25. Thus, also in the case where the feedback control of the intake pipe pressure to the intake pipe pressure PMgd that does not cause the melting damage of the catalyst 25 is performed, the intake air quantity can be accurately controlled to the intake air quantity that does not cause the melting damage of the catalyst 25.

The application of the present invention is not limited to the system having the two injectors per cylinder. Alternatively, the present invention can be also applied to a system that has three or more injectors per cylinder.

According to the first to fifth embodiments described above, the duty Vact of the actuator of the intake air quantity adjustment mechanism is controlled during the execution of the failsafe control. Alternatively, other control method than the duty control may be used as long as the intake air quantity adjustment mechanism is driven to restrict the intake air quantity during the execution of the failsafe control.

Further, the abnormality diagnosis method of the injector may be modified arbitrarily.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A control device of an internal combustion engine having a plurality of injectors provided on an intake side of each of a plurality of cylinders of the internal combustion engine, the control device comprising:
an abnormality diagnosis means for specifying an abnormal injector when either one of the plurality of injectors of either one of the cylinders becomes abnormal; and
a failsafe control means for performing failsafe control of prohibiting an injection operation of the injector specified to be abnormal by the abnormality diagnosis means and of performing increase correction of injection quantity of a normal injector such that fuel quantity equivalent to request injection quantity is injected only by the normal injector, wherein the failsafe control means restricts intake air quantity when the request injection quantity exceeds the maximum injection quantity that can be injected by the normal injector during execution of the failsafe control.

2. The control device as in claim 1, wherein
the failsafe control means restricts the intake air quantity by restricting at least one of a throttle opening degree, an intake valve lift amount, intake valve timing, an EGR valve opening degree and an airflow control valve with a guard value.

3. The control device as in claim 2, further comprising:
an airflow meter for sensing the intake air quantity, wherein
the failsafe control means performs feedback control of at least one of the throttle opening degree, the intake valve lift amount, the intake valve timing, the EGR valve opening degree and the airflow control valve such that a sensing value of the airflow meter coincides with a target restriction value when the failsafe control means restricts the intake air quantity.

4. The control device as in claim 2, further comprising:
an airflow meter for sensing the intake air quantity, wherein
the failsafe control means performs feedback control of at least one of the throttle opening degree, the intake valve lift amount, the intake valve timing, the EGR valve opening degree and the airflow control valve such that correction air quantity obtained by applying phase lead correction to a sensing value of the airflow meter coincides with a target restriction value when the failsafe control means restricts the intake air quantity.

5. The control device as in claim 2, further comprising:
an intake pipe pressure sensor for sensing intake pipe pressure, wherein
the failsafe control means performs feedback control of at least one of the throttle opening degree, the intake valve lift amount, the intake valve timing, the EGR valve opening degree and the airflow control valve such that a sensing value of the intake pipe pressure sensor coincides with a target restriction value when the failsafe control means restricts the intake air quantity.

6. The control device as in claim 1, wherein the internal combustion engine is configured to be able to set the request injection quantity greater than the maximum injection quantity of the single injector.

7. A method of controlling an internal combustion engine having a plurality of injectors provided on an intake side of each of a plurality of cylinders of the internal combustion engine, the method comprising:
specifying an abnormal injector when either one of the plurality of injectors of either one of the cylinders becomes abnormal; and
performing failsafe control of prohibiting an injection operation of the injector specified to be abnormal and of performing increase correction of injection quantity of a normal injector such that fuel quantity equivalent to request injection quantity is injected only by the normal injector, wherein
performing the failsafe control includes restricting intake air quantity when the request injection quantity exceeds the maximum injection quantity that can be injected by the normal injector during execution of the failsafe control.

8. The method as in claim 7, wherein
performing the failsafe control includes restricting the intake air quantity by restricting at least one of a throttle opening degree, an intake valve lift amount, intake valve timing, an EGR valve opening degree and an airflow control valve with a guard value.

9. The method as in claim 8, further comprising:
sensing the intake air quantity using an airflow meter, wherein
performing the failsafe control includes performing feedback control of at least one of the throttle opening degree, the intake valve lift amount, the intake valve timing, the EGR valve opening degree and the airflow control valve such that a sensing value of the airflow meter coincides with a target restriction value when the failsafe control restricts the intake air quantity.

10. The method as in claim 8, further comprising:
sensing the intake air quantity using an airflow meter, wherein
performing the failsafe control includes performing feedback control of at least one of the throttle opening degree, the intake valve lift amount, the intake valve timing, the EGR valve opening degree and the airflow control valve such that correction air quantity obtained by applying phase lead correction to a sensing value of the airflow meter coincides with a target restriction value when the failsafe control restricts the intake air quantity.

11. The method as in claim 8, further comprising:
sensing intake pipe pressure using an intake pipe pressure sensor, wherein
performing the failsafe control includes performing feedback control of at least one of the throttle opening degree, the intake valve lift amount, the intake valve timing, the EGR valve opening degree and the airflow control valve such that a sensing value of the intake pipe pressure sensor coincides with a target restriction value when the failsafe control restricts the intake air quantity.

12. The method as in claim 7, wherein the internal combustion engine sets the request injection quantity greater than the maximum injection quantity of the single injector.

* * * * *